Figure 1:
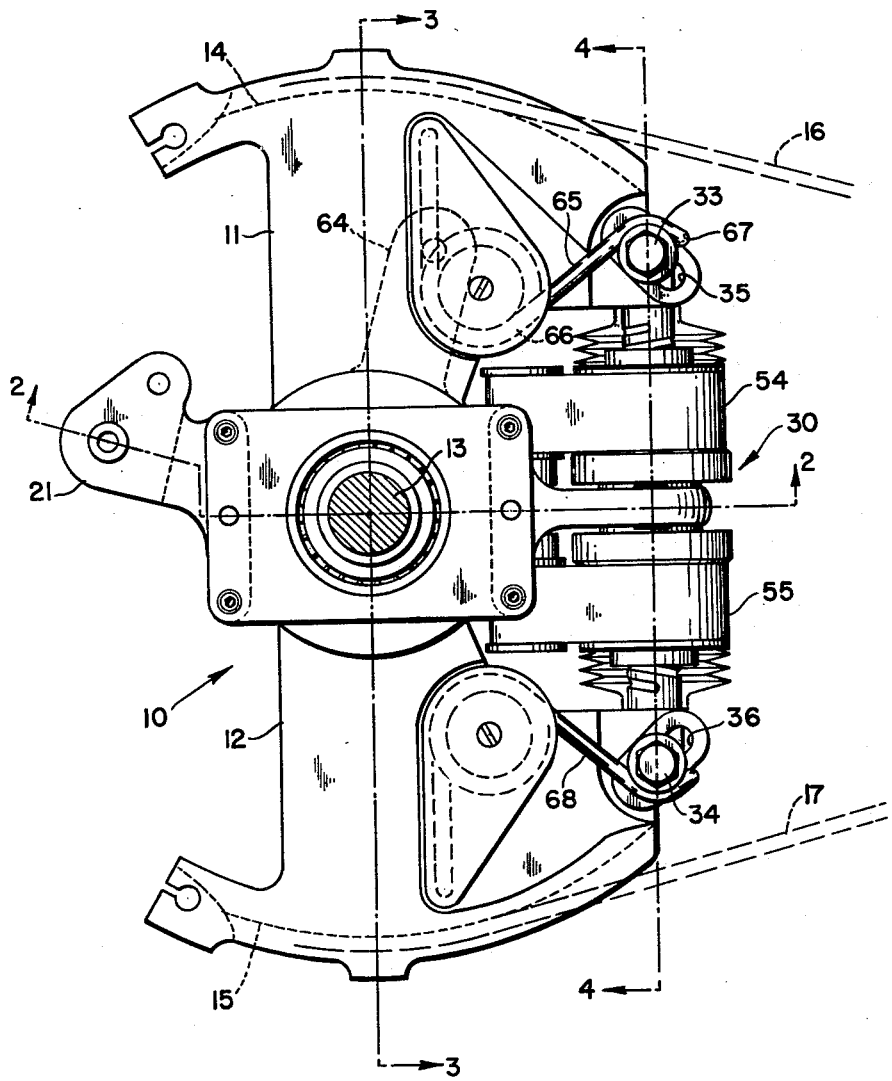

INVENTORS
DONALD R. DeMAAGD
ROLF BIELEFELD
BY
ATTORNEY

April 27, 1965  D. R. DE MAAGD ETAL  3,180,176
CABLE TENSION REGULATOR
Filed Feb. 15, 1961  3 Sheets-Sheet 2

INVENTORS
DONALD R. DeMAAGD
BY ROLF BIELEFELD

David Young
ATTORNEY

INVENTORS
DONALD R. DeMAAGD
ROLF BIELEFELD
BY
David Coury
ATTORNEY

United States Patent Office 3,180,176
Patented Apr. 27, 1965

3,180,176
CABLE TENSION REGULATOR
Donald R. De Maagd, Grandville, and Rolf Bielefeld, St. Joseph, Mich., assignors to Pneumo Dynamics Corporation, Cleveland, Ohio, a corporation of Delaware
Filed Feb. 15, 1961, Ser. No. 89,535
8 Claims. (Cl. 74—501.5)

The instant invention relates to cable tension regulators for use in control systems in which control movements are transmitted over substantial distances by means of control cables, the cable tension regulator being utilized to maintain the rig tension in the control cables. The cable tension regulator embodying the instant invention comprises compensating parts which are operative to maintain the rig tension of the control cables, and actuating parts by which force is transmitted through the cable tension regulator to one or the other of the control cables for transmission of control movements by a control cable.

It is the prime object of the instant invention to provide a cable tension regulator including improved means for maintaining the rig tension in control cables.

It is another object of the instant invention to provide a cable tension regulator including improved means for applying force to a control cable to transmit control movements through the cable tension regulator to the control cable.

It is a further object of the instant invention to provide an improved cable tension regulator which is compact in construction and highly efficient in operation.

It is still another object of the instant invention to provide an improved cable tension regulator having compensating parts including a screw device for maintaining the rig tension in control cables, and in which force is applied to rotate the rotatable part of the screw device for maintaining the rig tension of the control cables.

A still further object of the instant invention is to provide an improved cable tension regulator embodying negator springs to provide force for maintaining the rig tension in the control cables.

Still another object of the instant invention is to provide an improved cable tension regulator having means to maintain the rig tension of control cables, and including force transmitting means by which force is transmitted to the control cables, and means to apply force to the force transmitting means, the force transmitting means being operative to amplify the force applied thereto.

It is also an object of the instant invention to provide a cable tension regulator in which there is included slack take-up means which is operative to take up the slack in one control cable when the other control cable is placed under tension by transmission of a control movement through the other control cable.

Figure 2:
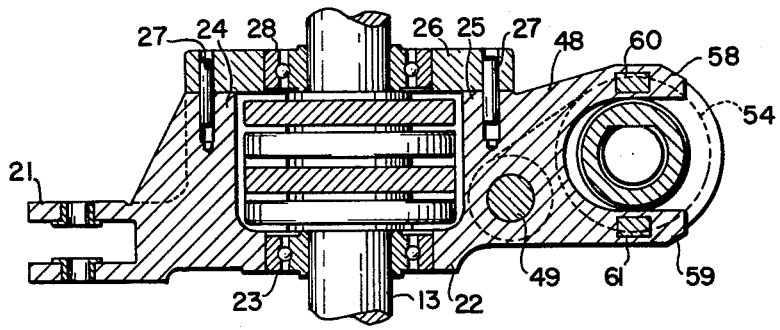
Figure 3:
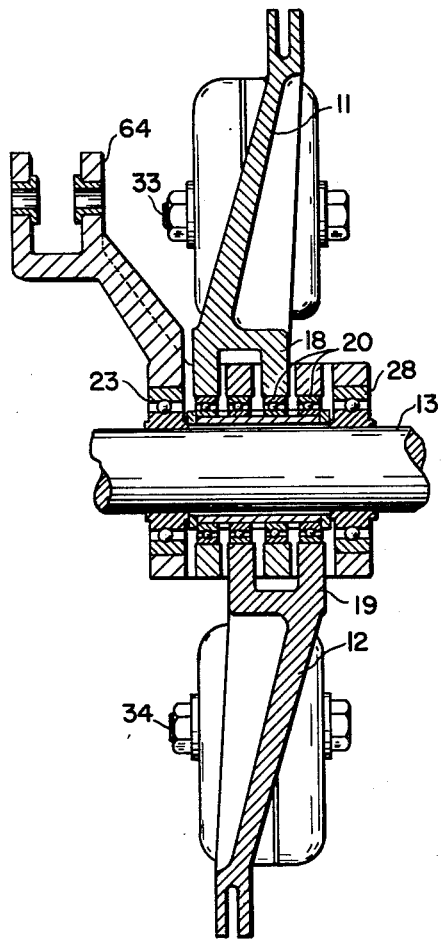
Figure 4:
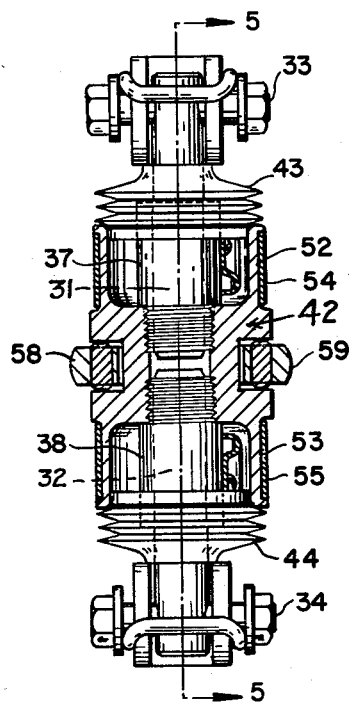
Figure 5:
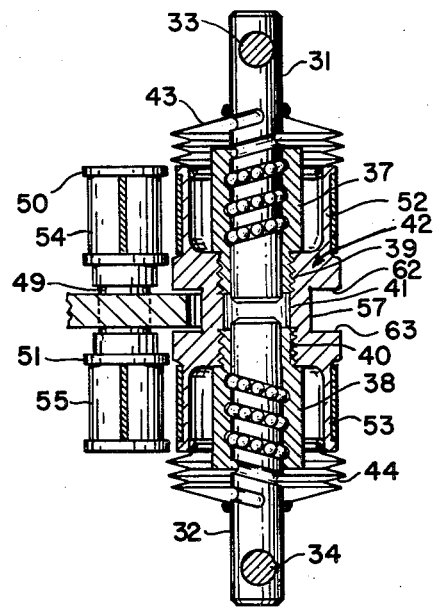

Further objects and advantages will appear from the following description and drawings, wherein:

FIG. 1 is a plan view of the cable tension regulator constructed in accordance with the instant invention, FIG. 2 is a sectional view of the cable tension regulator taken on the line 2—2 in FIG. 1, FIG. 3 is the sectional view of the cable tension regulator taken on the line 3—3 in FIG. 1, FIG. 4 is a sectional view showing certain of the compensating parts of the cable tension regulator, taken on the line 4—4 in FIG. 1, and FIG. 5 is a sectional view of the compensating parts of the cable tension regulator taken on the line 5—5 in FIG. 4.

The cable tension regulator to which the instant invention is applicable is utilized in control systems in which control movements are transmitted over substantial distances by control cables which extend the length of such distances. A pair of opposite control cables is utilized in the control system, and by applying tension force to one or the other of the control cables, there may be produced an actuating movement in either direction. In such a control system it is desirable to maintain the control cables at a constant rig tension so that the control movements transmitted through the control cables are accurately and faithfully reproduced at the terminal point. Such control systems find application in aircraft, where the control movement may be initiated in the forward end of the aircraft and transmitted either through the length of the aircraft fuselage or through the length of the wings to control surfaces, at which the control movement is reproduced for actuation of the aircraft control surfaces. In modern day, high speed aircraft it is especially important that the control system operate with great accuracy and predictability in reproducing the control movements at the control surfaces of the aircraft. In a control system utilizing control cables as aforementioned, the latter are affected by ambient conditions, such as moisture and temperature, which may vary the rig tension of the control cables. In order to overcome the effect of ambient conditions on the control cables, a cable tension regulator, such as that of the instant invention, is utilized for maintaining a constant rig tension in the control cables, so that under any ambient conditions of operation, control movements may be transmitted by the control cables with great accuracy and predictability to achieve the desired control of the aircraft.

Referring to the drawings there is illustrated therein a cable tension regulator 10 constructed in accordance with the instant invention. The cable tension regulator 10 includes a first sector 11 and a second sector 12 which are oppositely disposed on a shaft 13. Each of the sectors 11, 12 is formed with an arcuate periphery that is concentric with the shaft 13, and the sectors 11, 12 include grooves 14, 15, respectively, formed in the peripheries thereof for the reception of control cables 16, 17.

One end of each of the control cables 16, 17 is secured to a sector 11, 12, respectively, by suitable means which may consist of a ball peened to the end of the control cable and placed in a suitable complementally formed opening which engages the ball and thereby secures the cable. The sector 11 is formed with a twin hub 18, and the sector 12 is similarly formed with a twin hub 19, by which the sectors 11, 12 are rotatably mounted on the shaft 13. As best seen in FIG. 3, the twin hubs 18, 19 are interleaved, and suitable bearings 20 are fitted between the hubs 18, 19 and the shaft 13, whereby there may be free rotation of the sectors 11, 12 relatively to the shaft 13 and relatively to each other.

An actuating lever 21 is also mounted on the shaft 13. As best seen in FIG. 2, the actuating lever 21 has a hub 22, and a bearing 23 is fitted between the hub 22 and the shaft 13 for rotatably mounting the lever 21 on the shaft 13. The hub 22 has integral upstanding wall portions 24, 25, which are disposed at opposite sides of the shaft 13 and extend upwardly at diametrically opposite sides of the hubs 18, 19 of the sectors 11, 12. A hub plate 26 is seated on the tops of the wall portions 24, 25 over the hubs 18, 19, and is secured to the wall portions 24, 25 by a plurality of set screws 27, or the like. A bearing 28 is fitted between the hub plate 26 and the shaft 13 for rotation of the hub plate 26 relatively to the shaft 13. Thus the actuating lever 21 is rotatably mounted on the shaft 13 for rotation about the axis of the shaft 13, which may be independent of the rotation of the sectors 11, 12, as will be described in greater detail hereinafter.

The actuating lever 21 is disposed at one side of the sectors 11, 12 at a position approximately midway therebetween. At the opposite side of the sectors 11, 12 there is a force transmitting device 30, which extends between the adjacent ends of the sectors 11, 12, and which is connected thereto for applying force to the sectors 11, 12 in opposite directions, thereby producing opposite rotational movement of the sectors 11, 12 about the axis of the shaft 13, for application of constant and equal forces through the sectors 11, 12 to the respective control cables 16, 17 to maintain a constant rig tension in the control cables 16, 17.

The force transmitting device 30 has a pair of oppositely disposed ball screws 31, 32, which are oppositely threaded and are aligned with each other on the same axis extending between the sectors 11, 12. The screw 31 is pivotally connected to the end of the sector 11 by a pin 33, and the screw 32 is similarly connected to the end of the sector 12 by a pin 34. The pins 33, 34 are disposed in slots 35, 36, respectively, formed in the respective sectors 11, 12. The pins 33, 34 are normally disposed at the inner ends of the slots 35, 36, respectively, as will be described in greater detail hereinafter. Ball nuts 37, 38 are mated with the balls screws 31, 32, respectively. The inner ends of the ball nuts 37, 38 are formed with threaded portion 39, 40, respectively, which are threaded into the tapped bore 41 of a spring drum 42, whereby the ball nuts 37, 38 are fixedly secured to the spring drum 42 and will rotate with the latter. The ball screws 31, 32 are oppositely threaded with a steep lead angle, whereby axial movement of the ball screws 31, 32 will produce rotation of the ball nuts 37, 38 and the spring drum 42, for a purpose to be explained hereinafter. Flexible, corrugated sleeves 43, 44 extend between the ball screws 31, 32 and the adjacent ends of the spring drum 42 to provide a dust cover for sealing these elements.

A brake lever 48 is integrally formed with the actuating level 21 and extends radially from the hub 22 towards the force transmitting device 30. A shaft 49 is fixedly secured to the brake lever 48 and extends to opposite sides thereof, substantially parallel to the axis of the spring drum 42. Spools 50, 51 are freely, rotatably mounted on the opposite ends of the shaft 49, at opposite sides of the brake lever 48. The spring drum 42 is formed with opposite drum portions 52, 53, which are disposed in alignment with the spools 50, 51. A negator spring 54 has one end thereof secured to the drum portion 52, and the other end thereof is curled around the spool 50. A second negator spring 55 is similarly secured to the drum portion 54 and has its other end curled on the spool 51. The negator springs 54, 55 both operate in a direction to wind themselves on the spools 50, 51, thereby applying constant force to the spring drum 42 and acting to produce rotation of the spring drum 42 in a counterclockwise direction, as viewed in FIG. 2. Such rotation of the spring drum 42 simultaneously rotates the balls nuts 37, 38 which are secured thereto, and results in the production of opposite axial movement of the ball screws 31, 32 away from each other, which motion is transmitted to the sectors 11, 12 to rotate the latter in opposite directions about the axis of the shaft 13. Thus, the force transmitting device 30 normally operates to apply equal tension forces to the control cables 16, 17, to maintain the control cables 16, 17 under constant rig tension. Should ambient conditions be such that the control cables 16, 17 tend to shorten, the tension in the control cables 16, 17 will increase, tending to produce rotation of the sectors 11, 12 in clockwise and counterclockwise directions, respectively, as viewed in FIG. 1, which rotation will tend to produce opposite axial movement of the ball screws 31, 32 towards each other. Under these conditions, if the increased tension in the control cables 16, 17 is of such magnitude as to overcome the oppositely acting force of the negator springs 54, 55, there will be produced axial movement of the ball screws 31, 32, which, because of their steep lead angle will produce rotation of the ball nuts 37, 38 and the spring drum 42, thereby unwinding the negator springs 54, 55 from the spools 50, 51, until the tension in the control cables 16, 17 balances the force of the negator springs 54, 55, at which time the system will be stabilized at the desired rig tension of the control cables 16, 17.

The spring drum 42 is formed with an annular groove 57 which is centrally disposed between the drum portions 52, 53. The brake lever 48 is formed as a yoke having brake arms 58, 59 extending into the annular groove 57 at diametrically opposite sides of the spring drum 42. The brake arms 58, 59 have secured thereto brake pads 60, 61 formed of friction material having a high coefficient of friction. The brake pads 60, 61 are secured to the respective brake arms 58, 59 in apertures formed therein, and project slightly beyond the opposite surfaces of the brake arms 58, 59. Normally, the brake pads 60, 61 are spaced a slight distance from the opposite walls 62, 63 of the groove 57, which distance may be of the order of several thousandths of an inch, to permit free rotation of the spring drum 42, as previously described. When an actuating movement is applied to the actuating lever 21, the brake lever 48 is moved correspondingly, the movement thereof being about the axis of the shaft 13. By movement of the brake lever 48, the brake pads 60, 61 are brought into bearing contact with one or the other of the walls 62, 63 of the annular groove 57, depending upon the direction of movement of the brake lever 48. Engagement of the brake pads 60, 61 with one of the walls 62, 63 locks the spring drum 42 against rotation, and thereby locks the force transmitting device 30 and serves to prevent rotation of the sectors 11, 12 relatively to each other. Effectively then, the actuating lever 21 and the sectors 11, 12 are locked relatively to each other, and will then rotate together as a unit on the shaft 13 in accordance with the direction of the actuating movement applied to the actuating lever 21. Thus, the control movement of the actuating lever 21 will result in the application of a tension force to one or the other of the control cables 16, 17, depending upon the direction of the control movement applied to the actuating lever 21, and such control movement will be transmitted through the selected control cable to the remotely located actuated part. There may be provided a second actuating lever 64, also integrally formed with the hub 22 and the actuating lever 21, in which case the actuating lever 21 may be used for manual operation, and the second actuating lever 64 may be used for control by an automatic device connected to the second actuating lever 64.

Assuming that the actuating lever 21 is operated in a counter-clockwise direction as viewed in FIG. 1, the control movement thereof will be transmitted through the control cable 16, which is thereby placed under tension. The tension in the control cable 17 will be correspondingly relieved and there may be developed some slack in the control cable 17. Accordingly, there is provided in the cable tension regulator 10 a slack take-up device which is operative during the control operations. The pins 33, 34 are disposed in slots 35, 36 and normally take positions at the inner ends of the slots 35, 36, as seen in FIG. 1. The constantly acting force of the negator springs 54, 55, acting through the ball screws 31, 32 maintains the pins 33, 34 at the inner ends of the slots 35, 36. A wire spring 65 is secured to the sector 11 and is formed with a coil 66 intermediate its ends which tends to spread the legs of the wire spring 65. The wire spring 65 has one leg extending to the slot 35, and is formed with a bight 67 extending around the end of the sector 11 and engaging the pin 33 at opposite sides of the sector 11. The force of the spring 65 is thus applied to the pin 33 and is operative in a direction tending to move the pin 33 to the outer end of the slot 35. However, the force of the spring 65 acting on the pin 33 is less than the force of the negator spring 54 which is transmitted to the pin 33, so that normally the pin 33 is maintained at the inner end of the slot 35. The sector 12 similarly has a wire spring 68 which operates on the pin 34 in the same manner as described with respect to the spring 65 and the pin 33. Thus, during a control operation in which the control cable 17 may become slackened, the wire spring 68 will operate on the pin 34 tending to move the latter toward the outer end of the slot 36. However, since the force transmitting device 30 is locked during the control operation, the operation of the spring 68 will manifest itself by rotation of the sector 12 relatively to the sector 11 and actuating lever 21, and the control cable 17 will thereby be maintained under tension. The wire spring 65 is similarly operative with respect to the control cable 16 when the control movement of the actuating lever 21 is applied through the control cable 17.

In a cable tension regulator constructed in accordance with the instant invention, the control cables are maintained at equal and constant rig tension. This is achieved by use of negator springs which operate with a constant force that is applied by the force transmitting device and the sectors to the control cables. Also, in accordance with the invention, the force transmitting device includes elements for converting rotary motion to linear motion, which elements are the nuts and screws, and the negator springs act on the nuts, for application of the spring force to the nuts in a direction to rotate the latter, which in turn produces the linear motion of the screws. Thus, the spring force is applied in series with the nuts, and by operation of the nuts and screws there is achieved an amplification of the force of the negator springs. By the inventive construction disclosed herein, there is provided a cable tension regulator that is compactly constructed and highly efficient in operation for the purpose of maintaining a constant rig tension of control cables.

Obviously those skilled in the art may make various changes in the details and arrangements of parts without departing from the spirit and scope of the invention as defined by the claims hereto appended, and it is therefore desired that the invention not be restricted to the precise construction herein disclosed.

Having thus described and shown an embodiment of the invention, what it is desired to secure by Letters Patent of the United States is:

1. A cable tension regulator device for equalizing tension in a pair of cables comprising, a first sector and a second sector and means mounting said sectors on a common axis for arcuate movement in opposite directions, one of said cables being secured to the first sector and the other of said cables being secured to the second sector, force transmitting means extending between said sectors for applying force in opposite directions to said sectors arcuately to move the sectors equally in opposite directions to equalize and maintain the tension in said cables, said force transmitting means including a screw connected to each sector, said screws being oppositely threaded, a complemental nut element for each screw operatively engaged therewith, a spring drum and means securing said nut elements to the spring drum for rotation of the nut elements and the spring drum relatively to said screws, and a negator spring connected to the spring drum for constantly applying force to said spring drum to rotate the spring drum and the nut elements and transmit force from the spring drum through the nut elements to produce relative axial movement of the screws in opposite directions for arcuate movement of the sectors in opposite directions to maintain said control cables under constant tension.

2. A cable tension regulator device for equalizing tension in a pair of cables comprising, a first sector and a second sector and means mounting said sectors on a common axis for arcuate movement in opposite directions, one of said cables being secured to the first sector and the other of said cables being secured to the second sector, force transmitting means for applying force to said sectors arcuately to move the sectors equally in opposite directions to equalize and maintain the tension in said cables, said force transmitting means including a rotatable element, and means connected to said rotatable element constantly applying force to said rotatable element to rotate the rotatable element for transmission of force from the rotatable element to said sectors to maintain said cables under such constant tension.

3. The cable tension regulator device of claim 2 wherein said force transmitting means includes cooperating screw elements for applying force to said sectors arcuately to move the sectors equally in opposite directions to equalize and maintain the tension in said cables, one of said screw elements being rotatable relatively to the other of said screw elements, and means for applying force to said one rotatable screw element to rotate the rotatable screw element for transmission of force from the rotatable screw element through the other of said screw elements to said sectors to maintain said cables under constant tension as aforesaid.

4. The cable tension regulator device of claim 2 including brake means engageable with said rotatable element to lock the rotatable element against rotation to fix the position of the sectors relatively to each other for preventing relative movement of the sectors and to permit increased tension to be applied to one cable only for transmission of control movements.

5. The cable tension regulator device of claim 2 including brake means engageable with said rotatable element to lock said rotatable element against rotation to fix the position of said sectors relatively to each other for preventing relative rotation of said sectors and to permit increased tension to be applied to one cable only for transmission of control movements, such increased tension in said one cable causing a corresponding decrease in tension in said other cable, and lost motion connection means between each sector and said force transmitting means permitting limited relative arcuate movement of said sectors when said rotatable element is locked against rotation to take up any slack in said other cable which may result due to such decrease in tension.

6. A cable tension regulator device for equalizing tension in a pair of cables comprising, a first sector and a second sector and means mounting said sectors on a common axis for arcuate movement in opposite directions with said sectors extending in opposite radial directions from said axis, one of said cables being secured to the first sector and the other of said cables being secured to the second sector, force transmitting means extending between said sectors, said force transmitting means including means for applying force in opposite directions to said sectors arcuately to move the sectors equally in opposite directions to equalize and maintain the tension in said cables, a rotatable element in said force transmitting means, resilient means connected to said rotatable element constantly applying force to said rotatable element to rotate the rotatable element for transmission of force from the rotatable element to said sectors to maintain said cables under constant tension, a lever rotatably mounted on said axis for applying increased tension to one cable only by actuating movement of said lever, said lever including brake means engageable with said rotatable element to lock the rotatable element against rotation to fix the position of said sectors relatively to each other to prevent relative movement of said sectors and to permit such increased tension to be applied to such one cable only by actuating movement of said lever, and said resilient means also being secured to said lever with the force of the resilient means acting between the lever and the rotatable element.

7. A cable tension regulator device for equalizing tension in a pair of cables comprising, a first sector and a second sector and means mounting said sectors on a common axis for arcuate movement in opposite directions with said sectors extending in opposite radial directions from said axis, one of said cables being secured to the first sector and the other of said cables being secured to the second sector, force transmitting means extending between said sectors for applying force in opposite directions to said sectors arcuately to move the sectors equally in opposite directions to equalize and maintain the tension in said cables, said force transmitting means including a first screw connected to the first sector and a second screw connected to the second sector, said screws being oppositely threaded, a complemental nut for each screw operatively engaged therewith, a spring drum and said nuts being secured to said spring drum, said spring drum and nuts being rotatable relatively to said screws for relative axial movement of said screws in opposite directions, an annular groove formed in said spring drum, a drum portion of said spring drum being disposed at each side of the annular groove, a negator spring connected to each of said drum portions of the spring drum for constantly applying force to said spring drum to rotate the spring drum and the nut elements for transmission of force from the spring drum through said nuts and screws to the sectors to maintain said cables under constant tension, a lever for applying increased tension to one cable only by actuating movement of said lever for transmission of control movements of said lever through said one cable to a remotely located actuated part, said lever being rotatably mounted on said axis, a yoke formed on said lever including yoke arms disposed in said spring drum groove, said yoke arms including brake means engageable with a wall of said groove to lock the spring drum against rotation to fix the position of said sectors relatively to each other and to prevent relative movement of said sectors to permit such increased tension to be applied to said one cable only by actuating movement of said lever.

8. A cable tension regulator device for equalizing tension in a pair of cables comprising, a first sector and a second sector and means mounting said sectors on a common axis for arcuate movement in opposite directions, one of said cables being secured to the first sector and the other of said cables being secured to the second sector, force transmitting means extending between said sectors for applying force in opposite directions to said sectors arcuately to move the sectors equally in opposite directions to equalize and maintain the tension in said cables, said force transmitting means including a screw connected to the first sector and another screw connected to the second sector, said screws being oppositely threaded, a ball nut element for each screw operatively engaged therewith, a rotatable element and said ball nuts being secured thereto for rotation of the rotatable element and the ball nuts relatively to said screws, and means for applying force to said rotatable element to rotate the rotatable element and the ball nuts for transmission of force from the rotatable element through the ball nuts and the respective screws to said sectors to maintain said cables under constant tension.

References Cited by the Examiner
UNITED STATES PATENTS

| Re. 23,933 | 2/55 | Cushman | 74—501.5 |
| 2,810,300 | 10/57 | Pigford | 74—501.5 |
| 2,835,459 | 5/58 | Stewart | 74—527 X |
| 2,841,030 | 7/58 | Wrighton | 74—501.5 |
| 2,934,971 | 5/60 | Phelan | 74—501.5 |
| 2,992,568 | 7/61 | Benkovsky et al. | 74—501.5 |
| 3,016,761 | 1/62 | Wrighton et al. | 74—501.5 |

BROUGHTON G. DURHAM, *Primary Examiner.*